(12) United States Patent
Critchley et al.

(10) Patent No.: US 11,588,792 B2
(45) Date of Patent: Feb. 21, 2023

(54) SECURE TRANSMISSION OF SENSITIVE DATA DURING CALL PROCESSING

(71) Applicant: Sycurio Limited, Guildford (GB)

(72) Inventors: Timothy Critchley, Guildford (GB); Thomas Baldwin, Guildford (GB)

(73) Assignee: Sycurio Limited, Guildford (GB)

( * ) Notice: Subject to any disclaimer, the term of this patent is extended or adjusted under 35 U.S.C. 154(b) by 0 days.

(21) Appl. No.: 16/978,744

(22) PCT Filed: Mar. 7, 2019

(86) PCT No.: PCT/GB2019/050639
§ 371 (c)(1),
(2) Date: Sep. 7, 2020

(87) PCT Pub. No.: WO2019/171063
PCT Pub. Date: Sep. 12, 2019

(65) Prior Publication Data
US 2021/0051136 A1    Feb. 18, 2021

(30) Foreign Application Priority Data
Mar. 7, 2018    (GB) ...................................... 1803671

(51) Int. Cl.
*H04L 9/40*    (2022.01)
*H04M 3/51*    (2006.01)
(Continued)

(52) U.S. Cl.
CPC .......... *H04L 63/04* (2013.01); *H04M 3/5183* (2013.01)

(58) Field of Classification Search
CPC ................ H04L 63/04; H04M 3/5183; H04M 2203/6009; H04M 2203/609; H04W 12/02; G06F 21/606
(Continued)

(56) References Cited

U.S. PATENT DOCUMENTS 6,249,867 B1 * 6/2001 Patel ..................... H04L 9/0841
380/255
8,275,115 B1    9/2012 Everingham et al.
(Continued)

FOREIGN PATENT DOCUMENTS

WO    WO-2009136163 A2    11/2009
WO    WO-2017001816 A1    1/2017

OTHER PUBLICATIONS

International Search Report and Written Opinion of the International Searching Authority issued in PCT/GB2019/050639, dated May 14, 2019; ISA/EP.
(Continued)

*Primary Examiner* — Thjuan K Addy
(74) *Attorney, Agent, or Firm* — Harness, Dickey & Pierce, P.L.C.

(57) ABSTRACT

Apparatus for the transfer of sensitive information between two parties facilitated by an intermediary, the apparatus adapted to: receive from the first party voice signals and data signals; determine a parameter relating to an estimate of the time required for sensitive information to be determined from the data signals received from the first party; transmit to the intermediary the received voice signals and the parameter; determine sensitive information from the received data signals; and transmit the sensitive information to the second party. A corresponding method is also provided.

20 Claims, 2 Drawing Sheets

Figure 1:
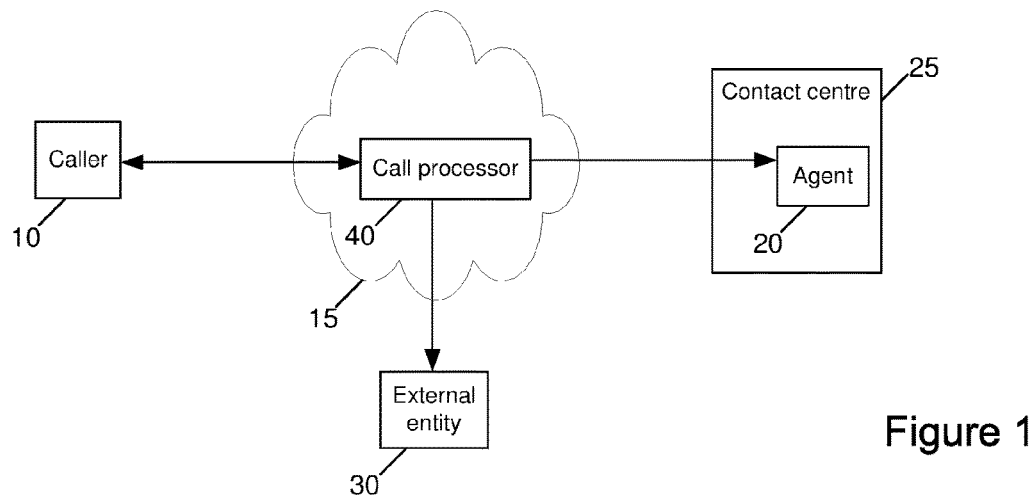

(51) Int. Cl.
*G06F 21/60* (2013.01)
*H04W 12/02* (2009.01)

(58) Field of Classification Search
USPC ............... 379/265.09, 265.05, 265.11, 91.01
See application file for complete search history.

(56) References Cited

U.S. PATENT DOCUMENTS

| | | |
|---|---|---|
| 9,307,084 B1 | 4/2016 | Pycko et al. |
| 9,407,758 B1 | 8/2016 | Pycko et al. |
| 9,544,438 B1* | 1/2017 | Andraszek .......... G06F 21/6245 |
| 10,200,407 B1* | 2/2019 | Dawkins ................. H04L 63/10 |
| 10,740,735 B2* | 8/2020 | Malhotra ........... G06Q 20/3276 |
| 2007/0022163 A1* | 1/2007 | Wormald ................ G06F 3/048 |
| | | 709/206 |
| 2012/0140911 A1 | 6/2012 | Johansen et al. |
| 2012/0158590 A1* | 6/2012 | Salonen ............. G06Q 20/4016 |
| | | 705/44 |
| 2015/0281446 A1 | 10/2015 | Milstein et al. |

OTHER PUBLICATIONS

United Kingdom Search Report under Section 17 issued in GB-1803671.5 , Date of Report Sep. 7, 2018.

* cited by examiner

SECURE TRANSMISSION OF SENSITIVE DATA DURING CALL PROCESSING

CROSS REFERENCE TO RELATED APPLICATIONS

This application is a U.S. National Phase Application under 35 U.S.C. 371 of International Application No. PCT/GB2019/050639 filed on Mar. 7, 2019, which claims the priority to Great Britain Patent Application No. 1803671.5 filed Mar. 7, 2018. The entire disclosures of all of the above applications are incorporated herein by reference.

This invention relates to a method of and apparatus for the secure capture and transfer of sensitive information between two parties facilitated by an intermediary.

Previously, the applicant developed a system (described in international PCT patent application WO2009136163) for telephone call processing which enables a caller to perform a transaction with another party (such as a merchant) which requires sensitive information (such as payment card details) to be provided by the caller to an external party (such as a payment provider) in order for the transaction to proceed (for example, to allow the card payment to be authorised), and to have the transaction facilitated by an intermediary (such as an agent at a call or contact centre, representing the merchant), without having to disclose the sensitive information to the intermediary.

In this previous system, during a telephone call between a caller and an agent, the caller inputs payment card details by means of a telephone keypad, thereby transmitting sensitive information via the voice channel as DTMF (dual-tone multi-frequency) tones. A call processor located between the caller and agent extracts the sensitive information from the tones present in the voice channel, determines relevant transaction information (such as details of the caller's payment card) and seeks authorisation for the transaction from the external entity, while also blocking at least some of the tones from, and thereby preventing the sensitive information being disclosed to, the agent.

Such call processing systems allow for transactions to be made via telephone while preventing unscrupulous agents recording tones and recovering the sensitive data for fraudulent purposes. As such, this and similar systems have proved popular with companies seeking to meet increasingly onerous financial data security requirements and enabling them to comply with regulations such as PCI-DSS by effectively outsourcing the processing of the sensitive data to an outside party (which provides the call processor), thereby taking the agent and the contact centre 'out-of-scope' of the regulations.

The present invention is concerned with enhancements to the previously developed system, particularly in respect of the interaction with the intermediary or agent and seeks generally to improve the accuracy and/or efficiency of the sensitive data capture process.

According to one aspect of the invention there is provided apparatus for the transfer of sensitive information between two parties facilitated by an intermediary, the apparatus adapted to: receive from the first party voice signals and data signals; determine a parameter relating to an estimate of the time required for sensitive information to be determined from the data signals received from the first party; transmit to the intermediary the received voice signals and the parameter; determine sensitive information from the received data signals; and transmit the sensitive information to the second party.

Preferably, the apparatus is further adapted to determine the parameter before receipt from the first party of data signals from which sensitive information is to be determined.

Preferably, the data signals comprise a first set of data signals and a second set of data signals, the second set of data signals comprising sensitive information, and the apparatus is further adapted to determine the parameter in dependence on the first set of data signals.

Preferably, the apparatus is further adapted to determine the parameter in dependence on a characteristic of the data signals received from the first party. The characteristic may be the rate at which the data signals are received from the first party.

Preferably, the apparatus is further adapted to determine a revised parameter in dependence on data signals received from the first party and, preferably, to transmit the revised parameter to the intermediary.

Preferably, the apparatus is further adapted to determine the parameter in dependence on historical data relating to data signals received from the first party.

Preferably, the apparatus is further adapted to trigger an alert in the event characteristics of the data signals received from the first party differ from historical characteristics of data signals received from the first party.

Preferably, the apparatus is further adapted to determine the parameter in dependence on historical data relating to data signals received from a plurality of parties other than the first party.

Preferably, the apparatus is further adapted to determine the parameter from a property of the first party. The property may comprise at least one of: geography, age, time of day and device used for input of the data signals.

Preferably, the apparatus is further adapted to transmit to the intermediary at least some voice signals received from the first party while receiving data signals from the first party.

Preferably, the apparatus is further adapted to block from the intermediary at least some voice signals received from the first party while receiving data signals from the first party.

Preferably, the apparatus is further adapted to operate in a secure mode during which sensitive information received from the first party is blocked from transmission to the intermediary.

Preferably, the apparatus is further adapted to trigger an alert in dependence on the transition to operating in secure mode.

Preferably, the apparatus is further adapted to determine the parameter in dependence on the time the apparatus is placed in the secure mode.

Preferably, the apparatus is further adapted to provide an indicator to the intermediary in dependence on the parameter.

Preferably, the data signals received from the first party comprise audio tones, preferably DTMF tones.

Preferably, the apparatus is further adapted to block at least some data signals comprising sensitive information received from the first party from transmission to the intermediary.

Preferably, the apparatus comprises a call processor comprising: a first telephone interface for receiving voice signals and data signals from the first party; a second telephone interface for transmitting voice signals to the intermediary; and a data interface for transmitting sensitive information to the second party.

The first party may be a caller to a contact centre, the second party may be an external entity such as a payment provider, and the intermediary may be an agent at a contact centre.

According to another aspect of the invention there is provided a method of transferring sensitive information between two parties facilitated by an intermediary, the method comprising: receiving from the first party voice signals and data signals; determining a parameter relating to an estimate of the time required for sensitive information to be determined from the data signals received from the first party; transmitting to the intermediary the received voice signals and the parameter; determining sensitive information from the received data signals; and transmitting the sensitive information to the second party.

Preferably, the method further comprises determining the parameter before receipt from the first party of data signals from which sensitive information is to be determined.

Preferably, the data signals comprise a first set of data signals and a second set of data signals, the second set of data signals comprising sensitive information, and the method further comprises determining the parameter in dependence on the first set of data signals.

Preferably, the method further comprises determining the parameter in dependence on a characteristic of the data signals received from the first party. The characteristic may be the rate at which the data signals are received from the first party.

Preferably, the method further comprises determining a revised parameter in dependence on data signals received from the first party and, preferably, transmitting the revised parameter to the intermediary.

Preferably, the method further comprises determining the parameter in dependence on historical data relating to data signals received from the first party.

Preferably, the method further comprises triggering an alert in the event characteristics of the data signals received from the first party differ from historical characteristics of data signals received from the first party.

Preferably, the method further comprises determining the parameter in dependence on historical data relating to data signals received from a plurality of parties other than the first party.

Preferably, the method further comprises determining the parameter from a property of the first party. The property may comprise at least one of: geography, age, time of day and device used for input of the data signals.

Preferably, the method further comprises transmitting to the intermediary at least some voice signals received from the first party while receiving data signals from the first party.

Preferably, the method further comprises blocking from the intermediary at least some voice signals received from the first party while receiving data signals from the first party.

Preferably, the method further comprises operating in a secure mode during which sensitive information received from the first party is blocked from transmission to the intermediary.

Preferably, the method further comprises triggering an alert in dependence on the transition to operating in secure mode.

Preferably, the method further comprises determining the parameter in dependence on the transition to operating in secure mode.

Preferably, the method further comprises providing an indicator to the intermediary in dependence on the parameter.

Preferably, the method further comprises blocking at least some data signals comprising sensitive information received from the first party from transmission to the intermediary.

Preferably, the method comprises operating a call processor, and: receiving, via a first telephone interface, voice signals and data signals from the first party; transmitting, via a second telephone interface, voice signals to the intermediary; and transmitting, via a data interface, sensitive information to the second party.

According to another aspect of the invention there is provided a method of operating the apparatus as described.

According to another aspect of the invention there is provides computer readable medium having stored thereon a program for carrying out any of the methods described.

Generally, there is provided a method of processing a telephone call (for example, by means of a call processor) in order to provide secure capture and transfer of sensitive information between two parties facilitated by an intermediary, the method comprising: receiving at a first telephone interface voice data and sensitive information from the first party; transmitting via a second telephone interface the voice data to the intermediary; and transmitting via a data interface: to the second party, information determined from the received sensitive information; and to the intermediary, data relating to the estimated time required for capture of the sensitive data from the first party.

This may allow for the agent to better react to progress of the call and the entry by the caller of the sensitive information without necessarily having direct feedback of this progress, which may in some systems not be available.

Further features of the invention are characterised by the dependent claims.

The reader will appreciate that some terms may be used interchangeably, for example:
caller, user
intermediary, agent
external entity, payment provider
information, data
integer, digit, element, tone A data integer or digit may refer to any alphanumeric character or group of characters, more generally to the smallest input unit corresponding to the caller pressing a key on the telephone keypad (or an equivalent means of input on a user device) and thereby generating a single tone (or DTMF tone pair). References to DTMF tones may be understood to encompass other forms of data transmission via a voice communication channel or equivalent.

The invention also provides a computer program and a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied apparatus aspects, and vice versa.

Equally, the invention may comprise any feature as described, whether singly or in any appropriate combination.

Furthermore, features implemented in hardware may generally be implemented in software, and vice versa. Any reference to software and hardware features herein should be construed accordingly.

Figure 2:
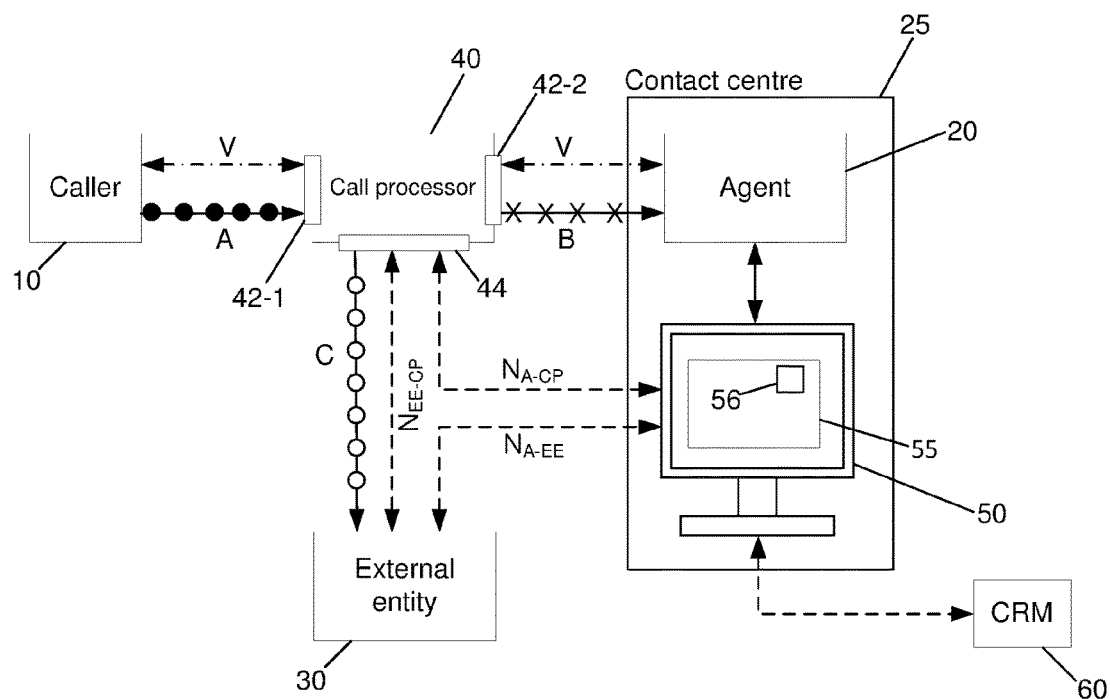
Figure 3:
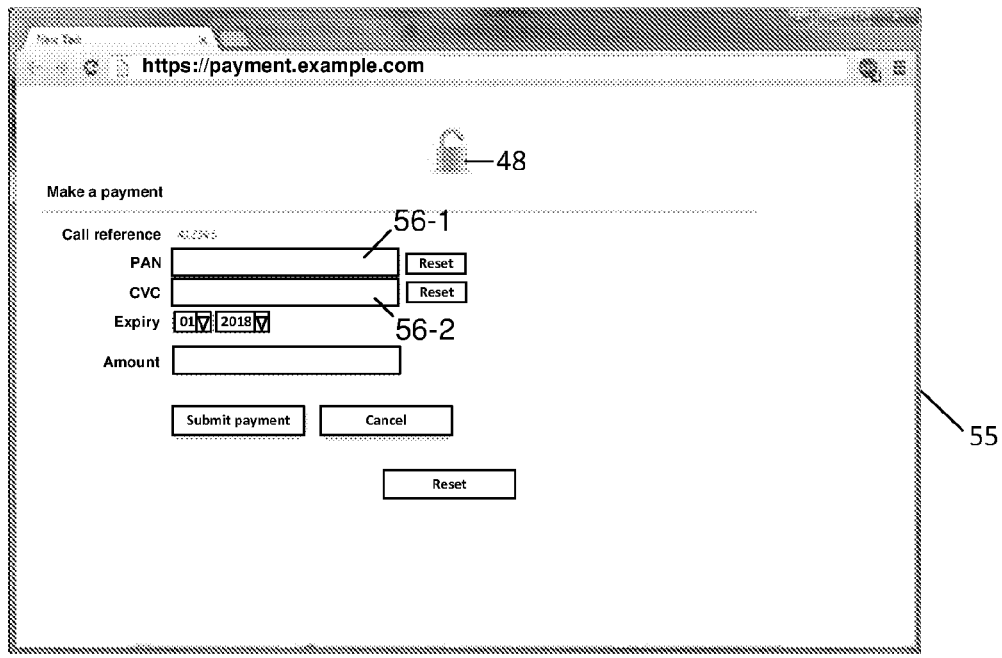
Figure 4:
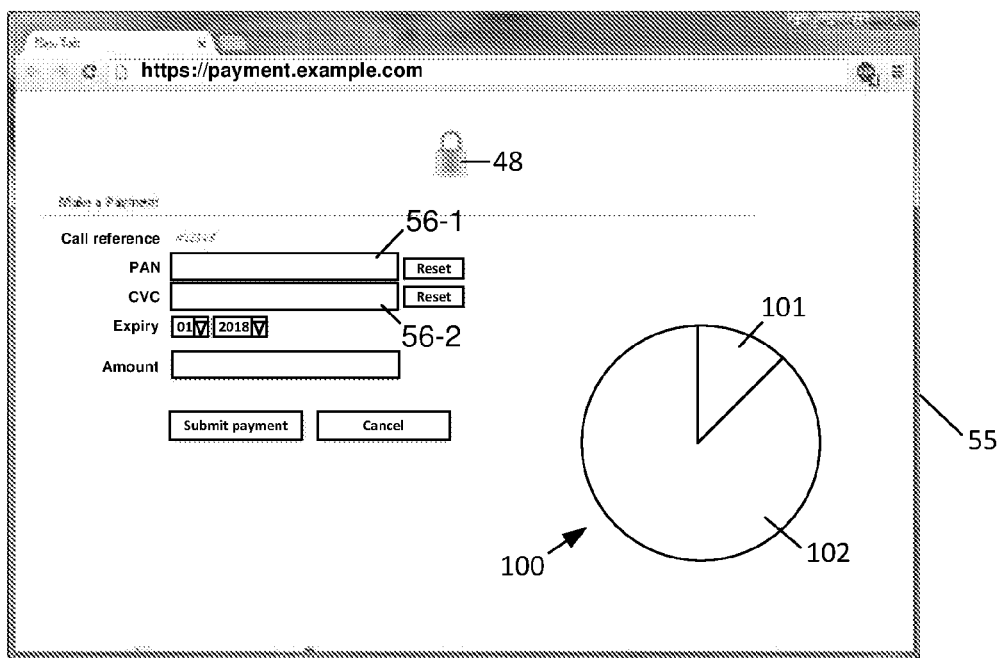

The invention will now be described, purely by way of example, with reference to the accompanying drawings, in which:

FIG. 1 shows a telephone call processing system;
FIG. 2 shows further detail of the call processing system;
FIG. 3 shows an example of an agent interface; and
FIG. 4 shows another example of an agent interface with a data capture completion estimator.

OVERVIEW

FIG. 1 shows a telephone call processing system, wherein a caller 10 communicates via a telephone network 15 with an agent 20 in a contact (or call) centre 25. The telephone call from the caller 10 to the agent 20 is routed via a call processor 40.

Call processor 40 comprises a computer processor, signal processing circuitry, telephone interfaces 42-1, 42-2 and data interface 44. Call processor 40 processes sensitive data (A) received from the caller 10, typically as DTMF or touch tones corresponding to inputs entered by the caller via a telephone keypad, routing relevant data (C) extracted from the tones to an external entity 30 (for example, for authorisation of a transaction) while preventing (B) the tones (and therefore the sensitive information) from reaching the agent 20.

Preferably, at least some of the voice component (V) of the call is maintained from caller 10 to agent 20 by the call processor 40 throughout to allow the agent 20 to assist caller 10 during the call.

Typically, call processor 40 is switchable between modes during the call, between a 'normal' mode wherein tones are allowed to pass—and thereby may allow the user to interact with a tone-activated interactive voice response (IVR) menu system, for example prior to being connected to the agent 20—and a 'secure' data capture mode for when the caller is transmitting the sensitive information. Switching between the modes may be determined by a trigger provided by the agent 20 or the caller 10, or determined from details of the call by the call processor 40. Once the sensitive data has been captured the call processor 40 may be switched back to 'normal' mode.

Call processor 40 may be located within the contact centre 25, preferably in a secure environment, or outside the contact centre 25, at a location 'upstream' within the telephone network 15 or even at the caller 10.

FIG. 2 shows further detail of the call processing system.

Agent 20 is provided with a computer 50 which displays an agent interface 55 allowing the agent to interact with the call processor 40, external entity 20 and typically also a customer relationship management (CRM) or other backend system 60.

Various items of data and data flows are shown, including:
Voice channel V maintained between caller 10 and agent 20 via call processor 40
Sensitive data A, provided by the caller 10, for example as audible DTMF tones within the voice channel, and received by the call processor 40
Blocked data B, as modified by the call processor 40 to prevent the sensitive data provided by the caller 10 from reaching the agent 20. Data B may be entirely absent, with no tones being passed by call processor 40 to the agent 20
Transaction data C, as determined by the call processor 40 from the received sensitive data provided by the caller 10, and transmitted to the external entity 30
Sundry data interactions N ($N_{A-CP}$, $N_{A-EE}$, $N_{EE-CP}$) between call processor 40, external entity 30 and agent computer 50

Also shown is data capture indicator 56 which forms part of the agent interface 55 and is used to inform the agent 20 regarding the status of the capture by the call processor 40 of the sensitive data A from the caller 10.

FIG. 3 shows an example of an agent interface. Here, data capture indicator 56 comprises two separate fields 56-1, 56-2 corresponding respectively to the PAN (primary account number) and CVC (Card Verification Code or Value) for a payment card. Generally, one or more such fields are present as appropriate for the number of items of sensitive information to be captured.

Data capture indicator 56 may be variously configured to indicate to the agent either:
i) directly, progress of the caller input of the sensitive information or
ii) indirectly, an estimate for when the secure capture is likely to complete
and to report on a successful (or unsuccessful) capture of the sensitive data once the capture process is complete and the call processor 40 exits secure mode.

A mode indicator 58 informs the agent 20 of whether the call processor 40 is in 'normal' or 'secure' mode.

Data Capture Progress Indicator

In some systems, the agent 20 receives real-time feedback on the instantaneous progress of sensitive data entry by the caller 10.

This may be, for example, by means of an audio with the call processor 40 transmitting tones which may be heard by the agent 20, preferably overwriting or replacing the sensitive data tones A so as to prevent the sensitive information reaching the agent 20. Such modified tones may be referred to as 'masked' tones.

Alternatively, or in addition, data capture indicator 56 may comprise a visual indicator such as a progress bar, a sequence of characters (for example *, unrelated to those of the sensitive information being entered by the caller) or some other graphical representation which is updated as each tone corresponding to an element of sensitive data A is received from caller 10 by call processor 40.

Data Capture Completion Estimator

Direct, real-time progress feedback may not always be possible or desirable, ie. no direct link may be provided between the input of each data element by the caller 20 and the masked tones and/or data capture indicator 56.

Nevertheless, it may be desirable for the agent and/or call processor to have some indication of the likely duration of the sensitive data capture—both in order to allow the agent to pre-emptively offer assistance to the caller in case of difficulty, and also to maximise the use of agent time by identifying time during which other tasks may be performed, for example, a post-call wrap-up or a web-based chat.

Having a known period of time for other tasks identified by the system may promote better use of that time by the agent, thereby improving overall efficiency.

In such embodiments, data capture indicator 56 functions as a data capture completion estimator or predictor, generally a parameter, in which the call processor 40 makes use of an algorithm to predict the likely duration (T) of sensitive data entry by the caller 10, despite during the secure data capture process ("secure mode") there being no direct feedback to the agent 20 about the rate at which data is being entered by the caller 10 and captured by the call processor 40. Instead, the data capture indicator 56 is used to inform the agent 20 of the predicted time the data capture process is likely to take.

In some embodiments, a default time for entry may be used, for example no more than 25, 20, 17, 15, 12, 10 or 5 seconds.

In some embodiments an aural indicator may also be provided by call processor 40 for the agent 20. Typically, a first aural indicator may be used to mark the start of the secure capture process and/or another to mark the end of the secure capture process. Aural indicators may be used when the secure capture process is terminated early. A distinct indicator may be used to identify the reason eg. "invalid BIN", "card type not accepted", "Luhn check failure" etc., to allow the agent to most speedily instruct the caller in how to correct their data entry. Where one or more aural indicators, comprising one or more tones, are used during the secure capture process these may not correspond to the DTMF tones being entered by the caller 10.

Alternatively, or in addition, a dedicated data capture completion estimator 100 may be used, which may appear as a separate widget on the agent interface.

FIG. 4 shows another example of an agent interface with a data capture completion estimator, comprising a circular graphical element 100. In use, the graphical element is animated, showing time elapsed 101 since the start of the secure capture process and the time remaining 102 until the estimated time of completion. Alternatively, a 'progress bar' may be used, similarly showing the passage of estimated time to completion.

T may be calculated from various start points:
 when the call processor 40 enters secure mode
 when the first digit is captured by call processor 40
 if the initial digits are sent in the clear (of which more below), when the first digit is masked from the agent
 wherein the time between say the start of secure mode and the entry of the first digit may be especially useful for estimating a value for T.

The prediction algorithm may calculate T in dependence on several factors including one or more of the following:
 Initial Sensitive Data Entry Rate
 In some embodiments, T is determined from the rate of entry by the caller 10 of the initial few digits of the sensitive data, for example in dependence on the average (mean, median or mode) time between data integers, preferably subsequent, more preferably consecutive data integers.
 Expected Number of Sensitive Data Digits
 In some embodiments, the number of expected digits is known due to the nature of the sensitive data involved. In other embodiments, the expected number of digits may be determined from the initial digits of the sensitive data, for example for a payment card by means of a Luhn or Bin check.
 Pre-Sensitive Data Entry Rate
 In some embodiments, T is determined from the rate of entry by the same caller 10 of other, non-sensitive data, which may be entered before the secure data capture process is initiated (ie. 'pre-sensitive' data), for example from data entered by the caller 10 earlier during the same telephone call, for example:
  digits entered during earlier navigation of the IVR menu system
  entry of caller-specific digits such as the telephone number
  non-sensitive data, such as a payment card type or expiry date (potentially requiring card data to be entered in a non-standard order)
  a sequence of test digits, such as 1-2-3-4, the input of which is requested by the agent Generally, the data entry rate is used by the call processor 40 to determine an estimated data entry rate and consequently to update the data capture indicator 56 accordingly.

In some embodiments, both the initial sensitive data and pre-sensitive data entry rates are used in combination in order to determine T.
 Clear Data Entry Rate
 In some embodiments, T is determined from tones which are sent in the clear.

Some regulations may permit certain digits of the sensitive information to be transmitted to the agent in the clear and displayed unmasked in the data capture indicator 56 of the agent interface 55. The transmission of these digits may be used to determine the value of T and/or to update and otherwise calibrate the initial value of T.

Generally, if a data entry rate calibration shows the rate of data entry to be either increasing or decreasing the value of T may be adjusted accordingly.

The data capture indicator 56 may be recalibrated only once, before its initial display to the agent 20, or else during the secure capture mode with the recalibration resulting in a step update of the data capture indicator 56.
 Data Entry Characteristics
 In some embodiments, T is determined from the duration of individual digit input tones.

These may be taken to correspond to the length of time the caller 10 takes to depress a key on the telephone keypad, which in turn suggests for longer tones a more deliberate and therefore slower rate of data entry by the caller 10.
 Data Grouping
 In some embodiments, T is determined from the rate the caller 10 inputs groups of data.

Where the sensitive information is grouped, in the sense of comprising short sequences of digits (as for example with some payment cards, where a 16-digit number may be grouped into four sets of four digits) the caller 10 may when inputting the sensitive data pause briefly after each group.

If the number of digits and their grouping is known or may be determined (for example from the initial few digits), the value of T is suitably adjusted to take account of expected pauses.
 Aggregated Data Entry Rates
 In some embodiments, T is determined from aggregated data entry rates determined for multiple, plurality or a population of callers.

Examples of how such input data may be aggregated include:
 calls to a particular call centre or merchant
 calls to a plurality of sector specific merchants
 Other Properties
 In some embodiments, T is determined from other properties of the caller and/or merchant of the call, for example:
  geography
  age of caller
  time of day
  the type of device being used by the caller (fixed devices with physical keypads typically allowing for faster data input than say mobile devices with on-screen keypads)

Historical Data Entry Rate

In some embodiments, T is determined from historical data determined from previous calls, whether by the same caller or other callers, relating to data entry rates and overall input duration. The historical data offers an insight into how the caller interacts with tone-input systems.

Callers may be identified by telephone number or other identifier(s), eg. an account number provided by a merchant.

Agent Alerts

Once the sensitive data has been safely captured the secure data capture process is terminated, the call processor 40 returns to 'normal' mode and agent 20 is informed accordingly.

There may also be occasions for the agent 20 to be prompted, for example by the call processor 40, to make an earlier intervention.

Early Termination

In some situations it may be necessary to terminate the secure data capture process early, for example:

If an error occurs in the secure data capture process, the process is terminated and the agent informed—optionally, with the option to restart the process and attempt the secure capture again, albeit preferably this is done only a limited number of times.

The secure data capture process may also be terminated early if say the first few captured digits of the sensitive information allow for determination of incompatibility to be made, for example that the payment card is not supported by the merchant.

Agent Prompts & Interventions

More generally, the call processor 40 may prompt the agent 20 to intervene and enquire of the caller 10 during the secure capture process, for example:

If the predicted time for the secure capture process has expired but the process has not yet completed, ie. the expected sensitive data has not been fully captured If input from the user pauses by more than a determined amount The timing of these agent prompts may be predetermined, or determined from the data entry characteristics of the particular caller 10 or the historical characteristics of the caller or the population of callers.

Preferably, in the event that agent 20 is prompted to intervene the secure capture process is paused and recommences from whichever the secure capture had reached beforehand.

Alternatively, upon agent intervention the secure capture process is halted, the already captured digits are saved, and a new capture process is started in order to capture the remainder of the sensitive information. The various parts or sequences of captured sensitive data are then assembled to produce the sensitive information in correct order.

When assembling the various parts of the captured sensitive data a check is made to ensure no accidental duplication of data (for example a first sequence of captured digits 1-7, a second sequence of 5-16)

A validity check, such as a Luhn check may also be performed to confirm the assembled data sequence is valid.

Fraud Prevention

In a further embodiment, a fraud prevention system is proposed which makes use of historical user data entry data.

For example, if a call purporting to be from a caller "John Smith" is determined to have uncharacteristic DTMF entry behaviour (compared to the characteristics as previously stored for the true John Smith), the agent is prompted to perform additional identity checks—especially if the actions requested by "John Smith" are unusual or serious, eg. a request for a change to key account details.

Determining whether the data entry behaviour is uncharacteristic involves scoring for departures from expected characteristics, for example data entry rate, key press duration etc as well as other call properties such as the use of a new telephone number or Caller Line Identifier (CLI).

It will be understood that the invention has been described above purely by way of example, and modifications of detail can be made within the scope of the invention.

Reference numerals appearing in any claims are by way of illustration only and shall have no limiting effect on the scope of the claims.

The invention claimed is:

1. Apparatus for the transfer of sensitive information between two parties facilitated by an intermediary, the apparatus adapted to:
   receive from the first party voice signals and data signals;
   determine an estimate of the time required for sensitive information to be determined from the data signals received from the first party;
   transmit to the intermediary the received voice signals and the estimate;
   determine sensitive information from the received data signals; and
   transmit the sensitive information to the second party,
   wherein the apparatus is adapted to, based on a comparison between the estimate and an elapsed time, trigger an alarm to the intermediary.

2. Apparatus according to claim 1, wherein the apparatus is further adapted to determine the estimate before receipt from the first party of data signals from which sensitive information is to be determined.

3. Apparatus according to claim 2, wherein the data signals comprise a first set of data signals and a second set of data signals, the second set of data signals comprising sensitive information, and wherein the apparatus is further adapted to determine the estimate in dependence on the first set of data signals.

4. Apparatus according to claim 1, wherein the apparatus is further adapted to determine the estimate in dependence on a characteristic of the data signals received from the first party,
   wherein the characteristic is the rate at which the data signals are received from the first party,
   wherein the apparatus is further adapted to determine a revised estimate in dependence on data signals received from the first party and to transmit the revised estimate to the intermediary.

5. Apparatus according to claim 1, wherein the apparatus is further adapted to determine the estimate in dependence on historical data relating to at least one of:
   data signals received from the first party,
   wherein the apparatus is further adapted to trigger an alert in the event characteristics of the data signals received from the first party differ from historical characteristics of data signals received from the first party, and
   data signals received from a plurality of parties other than the first party.

6. Apparatus according to claim 1, wherein the apparatus is further adapted to determine the estimate from a property of the first party, wherein the property comprises at least one geography, age, time of day and device used for input of the data signals.

7. Apparatus according to claim 1, wherein the apparatus is further adapted to at least one of:

transmit to the intermediary at least some voice signals received from the first party while receiving data signals from the first party;

block from the intermediary at least some voice signals received from the first party while receiving data signals from the first party; and operate in a secure mode during which sensitive information received from the first party is blocked from transmission to the intermediary, wherein the apparatus is further adapted to trigger an alert in dependence on the transition to operating in the secure mode, and wherein the apparatus is further adapted to determine the estimate in dependence on the time the apparatus is placed in the secure mode.

8. Apparatus according to claim 1, wherein the apparatus is further adapted to provide an indicator to the intermediary in dependence on the estimate.

9. Apparatus according to claim 1, wherein the data signals received from the first party comprise audio tones, including DTMF tones.

10. Apparatus according to claim 1, wherein at least one of:
the first party is a caller to a contact center;
the second party is an external entity such as a payment provider; and
the intermediary is an agent at a contact center.

11. A method of transferring sensitive information between two parties facilitated by an intermediary, the method comprising:
receiving from the first party voice signals and data signals;
determining an estimate of the time required for sensitive information to be determined from the data signals received from the first party;
transmitting to the intermediary the received voice signals and the estimate;
determining sensitive information from the received data signals; and
transmitting the sensitive information to the second party,
further comprising the step of triggering an alarm to the intermediary based on a comparison between the estimate and an elapsed time.

12. A method according to claim 11, wherein the method further comprises determining the estimate before receipt from the first party of data signals from which sensitive information is to be determined.

13. A method according to claim 12, wherein the data signals comprise a first set of data signals and a second set of data signals, the second set of data signals comprising sensitive information, and the method further comprises determining the estimate in dependence on the first set of data signals.

14. A method according to claim 11, wherein the method further comprises determining the estimate in dependence on a characteristic of the data signals received from the first party,
wherein the characteristic is the rate at which the data signals are received from the first party, and
wherein the method further comprises determining a revised estimate in dependence on data signals received from the first party and transmitting the revised estimate to the intermediary.

15. A method according to claim 11, wherein the method further comprises determining the estimate in dependence on historical data relating to at least one of:
data signals received from the first party,
wherein the method further comprises triggering an alert in the event characteristics of the data signals received from the first party differ from historical characteristics of data signals received from the first party; and
data signals received from a plurality of parties other than the first party.

16. A method according to claim 11, wherein the method further comprises determining the estimate from a property of the first party, wherein the property comprises at least one of: geography, age, time of day and device used for input of the data signals.

17. A method according to claim 11, wherein the method further comprises at least one of:
transmitting to the intermediary at least some voice signals received from the first party while receiving data signals from the first party;
blocking from the intermediary at least some voice signals received from the first party while receiving data signals from the first party; and
operating in a secure mode during which sensitive information received from the first party is blocked from transmission to the intermediary,
wherein the method further comprises triggering an alert in dependence on the transition to operating in the secure mode, and
wherein the method further comprises determining the estimate in dependence on the transition to operating in the secure mode.

18. A method according to claim 11, wherein the method further comprises providing an indicator to the intermediary in dependence on the estimate.

19. A method according to claim 11, wherein the data signals received from the first party comprise audio tones, including DTMF tones.

20. A method according to claim 11, wherein at least one of:
the first party is a caller to a contact center;
the second party is an external entity such as a payment provider; and
the intermediary is an agent at a contact center.

* * * * *